Oct. 27, 1964  R. B. ANDERSON ETAL  3,154,227
DECANTER WITH POURING SPOUT AND SEAL
Filed Sept. 25, 1961

ROBERT B. ANDERSON
WARAND R. KIRSCH
INVENTORS

BY Lyon Lyon
ATTORNEYS

United States Patent Office 3,154,227
Patented Oct. 27, 1964

3,154,227
DECANTER WITH POURING SPOUT AND SEAL
Robert B. Anderson, Altadena, and Warand R. Kirsch,
El Monte, Calif., assignors, by mesne assignments, to
Farmer Bros. Co., Torrance, Calif., a corporation of
California
Filed Sept. 25, 1961, Ser. No. 140,323
3 Claims. (Cl. 222—542)

This invention relates to decanter, more particularly to decanters which are used to dispense coffee. Included in the objects of this invention are:

First, to provide a decanter which utilizes a glass vessel and a novelly arranged spout and seal means adapted to be mounted on the mouth of the vessel, to facilitate pouring without danger of leakage around the mouth of the vessel.

Second, to provide a decanter having a removable spout construction which accommodates the mouth of a glass vessel even though the dimensions of the mouth may not be held to close tolerances in the course of manufacture.

Third, to provide a spout construction for coffee decanters which, without removal, may be readily cleaned, washed, or rinsed when the vessel is cleaned, washed, or rinsed.

Fourth, to provide a spout construction which may be readily and quickly removed for cleaning, or transferred from one glass vessel to another, should the vessel be broken.

With the above and other objects in view, as may appear hereinafter, reference is directed to the accompanying drawings in which.

Figure 1:
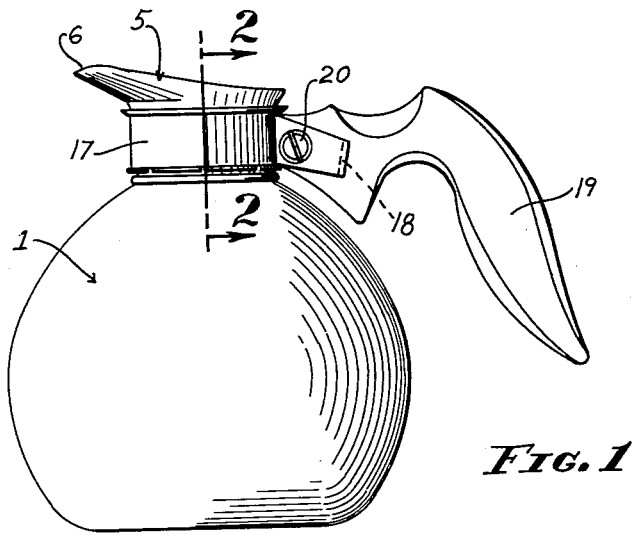
FIGURE 1 is a side view of the decanter, showing the removable spout structure in place.
Figure 2:
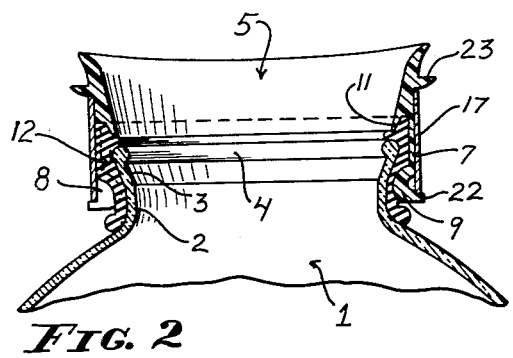
FIGURE 2 is an enlarged, fragmentary, sectional view of the upper portion of the decanter and removable spout taken through 2—2 of FIGURE 1.
Figures 4, 5:
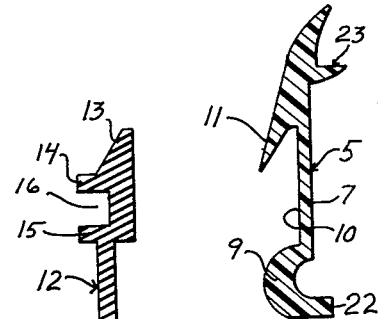
FIGURE 4 is a further enlarged, fragmentary, sectional view of the sealing ring.
FIGURE 5 is an enlarged, fragmentary, sectional view of the spout ring.
Figure 3:
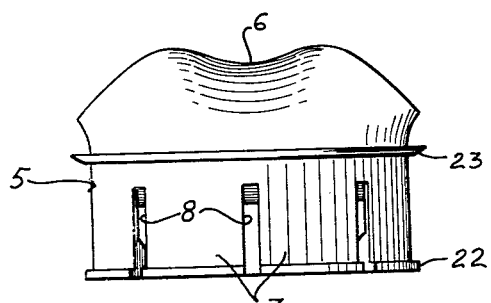
FIGURE 3 is a front view of the spout ring.

The decanter includes a vessel 1, preferably formed of glass and generally spherical in form with a flat bottom. At its upper end the vessel is provided with a neck portion 2 which flares upwardly slightly and merges into a mouth 3 having an increased flare. The extended end of the mouth terminates in a bead 4. It has been found that an optimum flare for the neck is approximately 5°; whereas, the mouth flare is approximately 25°.

In the manufacture of the glass vessel 1, the glass is cut at the extremity of the mouth 3 and then treated in a flame to form the bead 4. As a consequence, the dimensions of the bead may vary substantially.

The mouth of the vessel is adapted to be fitted with a spout ring 5 formed of plastic material which is capable of withstanding the temperature of boiling water.

The upper axial end of the spout ring 5 is shaped to form a pouring spout portion 6. The lower axial end of the spout ring 5 is provided with downwardly extending fingers 7 separated by axial slots 8. The extremities of the fingers 7 form a divided internal flange 9 which confronts the neck of the vessel 1.

Above the internal flange 9 the fingers 7 define an internal channel 10 which surrounds the bead 4 of the mouth 3. The upper wall of the channel 10 is undercut to form a lip 11 which overlies the bead 4. In the region outwardly of the channel 10, the fingers 7 are relatively thin. A plastic material is selected for the spout ring 5 which has sufficient resiliency that the fingers 7 may spread to permit the internal flange to pass over the bead 4.

The channel 10 receives a seal ring 12 formed of rubber or other relatively soft elastomer capable of withstanding the temperatures of hot beverages. The seal ring 12 is provided with a wedge-shaped upper end 13 which fits within the undercut lip 11. The seal ring 12 is also provided with internal, distortable flanges 14 and 15 separated by a channel 16 which receives the bead 4. The seal ring is sufficiently soft that it tends to conform to the bead 4 even though the dimensions of the bead may vary substantially.

The spout ring 5 is held in place on the vessel 1 by means of a split band 17 having outwardly directed parallel tabs 18 which fit on opposite sides of a handle 19. The extremities of the tabs 17 may turn inwardly and fit mating slots in the handle, so that a single fastening means, such as a bolt 20, may extend through the tabs 18 and the handle 19.

The external surface of the spout ring 5 and the fingers 7, which receive the band 17, are cylindrical and are bordered by a small lower flange 22 and a wider upper flange 23 which overlie the lower and upper margins of the band 17, so as to retain the band 17 in proper place with respect to the seal ring 12. The upper flange 23 being wider aids in guiding the band 17 into place.

Assembly of the vessel and spout structure is as follows:

The seal ring 12 is fitted in the internal channel 10. The spout ring is forced downward over the mouth of the vessel 1 until the internal flange 9 fits the neck portion 2. The split band 17 is then applied around the spout ring 5 and the fingers 7, the handle 19 is inserted between the tabs 18, and the fastening means 20 is secured.

It will be noted that the undercut lip 11 extends into close proximity to the bead 4 so that only a minimum portion of the seal ring 12 is exposed to beverages which may be poured from the vessel 1.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A decanter, comprising: a vessel having a neck portion and a flared mouth above the neck portion; a spout ring having a plurality of yieldable fingers adapted to fit over said mouth and neck portion and forming a divided internal flange adapted to surround said neck portion, said fingers and the portion of said spout ring above said fingers forming an internal channel surrounding said mouth; a yieldable sealing ring fitted in said channel and sealingly engaging said mouth; and a band encircling said fingers to hold said divided internal flange in said neck portion.

2. A decanter, comprising: a vessel having a neck portion and a flared mouth above the neck portion; a spout ring having a spout portion at its upper end and a plurality of fingers extending downwardly from its lower end, said fingers defining an internal channel surrounding said mouth and having at least one undercut side wall, and also forming below the channel an internal flange fitting said neck portion; a yieldable sealing ring fitted in said channel and sealingly engaging said mouth; and a band encircling said fingers to hold said internal flange in said neck portion.

3. The combination with a decanter vessel having a flared mouth and a neck portion of reduced diameter therebelow, of a pouring spout structure for removable attachment to said vessel, said spout structure, comprising: a spout ring having an undercut lip above and spaced from the mouth of the vessel, yieldable fingers disposed radially outward of said lip and extending downwardly therefrom, said fingers forming an internal flange adapted to fit said neck portion and defining an internal channel between said lip and internal flange, and a spout portion continuing from the upper end of said spout ring; a yieldable sealing ring fitted in said channel and sealingly engaging said mouth; and a band encircling said fingers to hold said internal flange in said neck portion.

References Cited in the file of this patent

UNITED STATES PATENTS

| | | |
|---|---|---|
| 1,027,421 | Jungclas | May 28, 1912 |
| 2,998,169 | Fischer | Aug. 29, 1961 |
| 3,059,822 | Eisendrath et al. | Oct. 23, 1962 |